United States Patent [19]

Clarke

[11] 4,392,395
[45] Jul. 12, 1983

[54] INFINITELY VARIABLE TRANSMISSION
[75] Inventor: John M. Clarke, Dunlap, Ill.
[73] Assignee: Caterpillar Tractor Co., Peoria, Ill.
[21] Appl. No.: 226,273
[22] Filed: Jan. 19, 1981
[51] Int. Cl.³ .............................................. F16H 37/06
[52] U.S. Cl. ........................................ 74/690; 74/793; 74/796; 74/198
[58] Field of Search ................... 74/690, 691, 689, 190, 74/198, 793, 796, 740

[56] References Cited
U.S. PATENT DOCUMENTS 2,727,396 12/1955 Haugwitz .............................. 74/198
2,923,176  2/1960 Randt ................................... 74/740
3,194,088  7/1965 Erban ................................... 74/691

Primary Examiner—Leslie A. Braun
Assistant Examiner—Frank H. McKenzie, Jr.
Attorney, Agent, or Firm—Wood, Dalton, Phillips, Mason & Rowe

[57] ABSTRACT

An infinitely variable power transmission having three power transmitting shafts (14,16,25) differentially rotatable around a common axis (20) and connected together by at least one bevel wheel (12) rotatable around a nutating axis (22). The nutating axis (22) intersects the common axis (20) and is carried by the first shaft (16) around the common axis (20). The second shaft (25) has a bevel gear (26) connecting it to the wheel (12) perimeter. The wheel (12) sits on a convex segment (13) of the third shaft (14) making a single traction point (52) in the plane defined by the axes (20,22). Power may be applied to any two of the shafts with the speed of the power output by the third being controlled by the location of the traction point (52). The traction point (52) may be moved within the plane so that for any single engine speed, the speed of the power output shaft may be infinitely varied in a specific range. A new range is obtained without disconnecting the drive by selecting a new speed for one of the input shafts which at that time can be free of torque.

18 Claims, 7 Drawing Figures

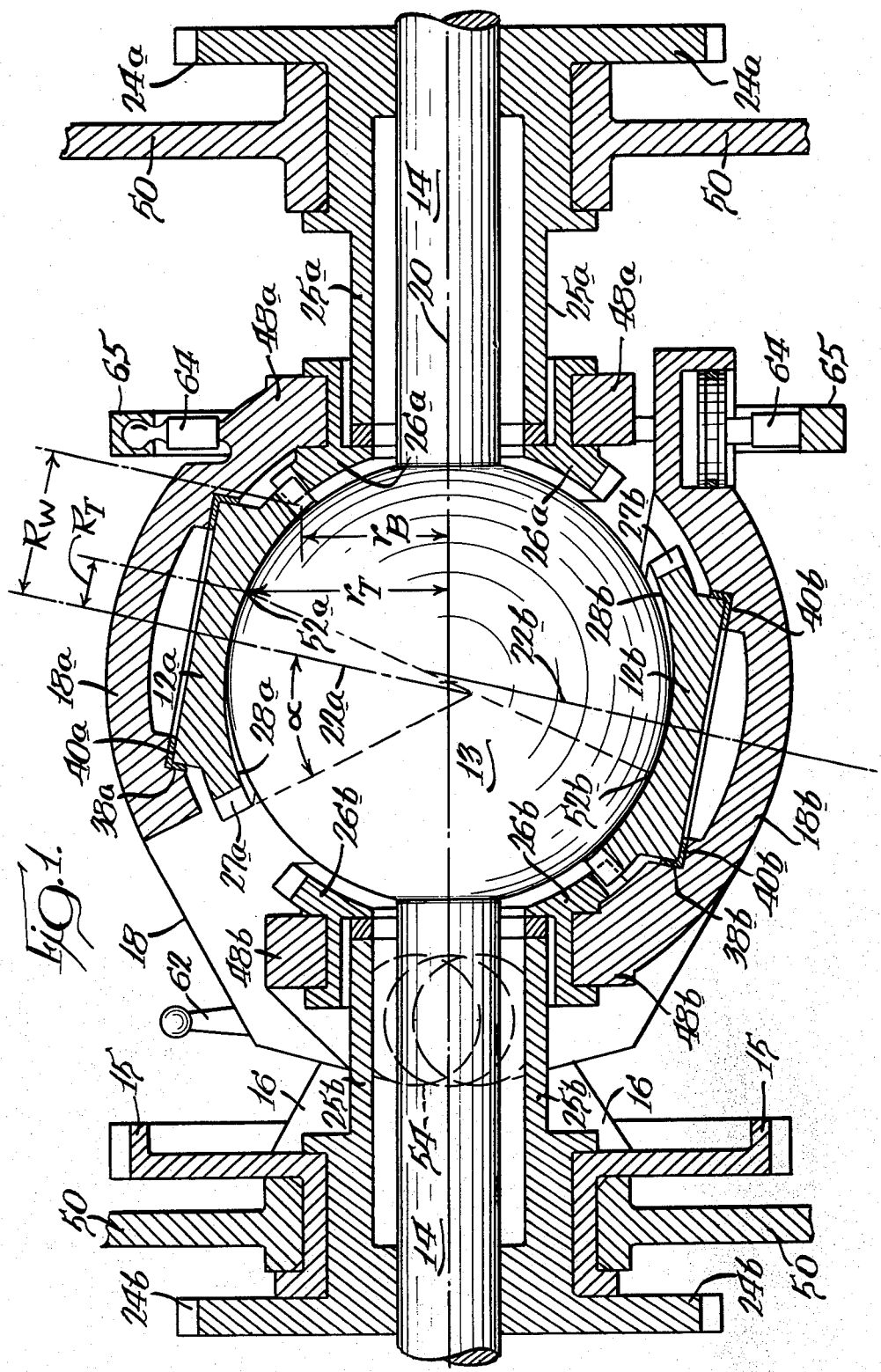

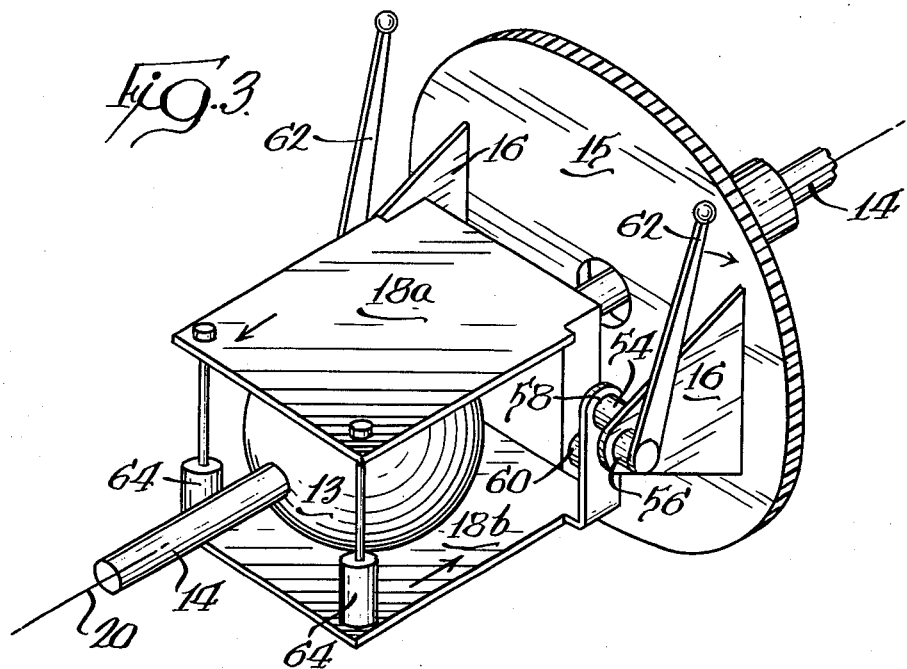
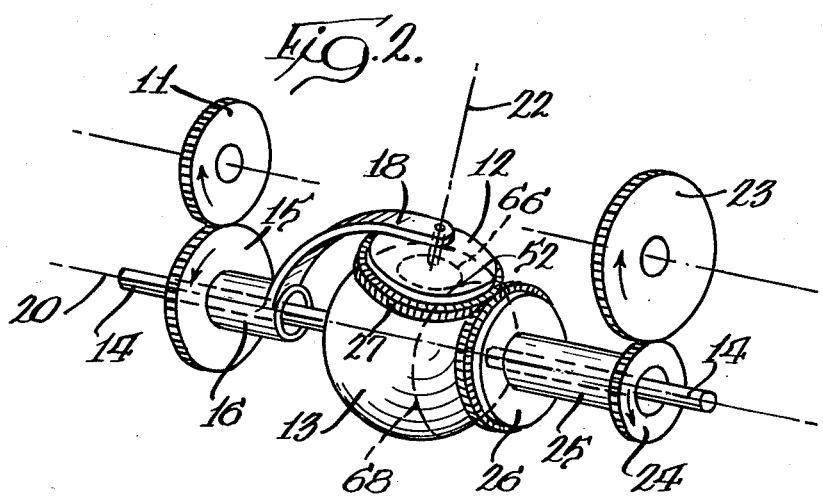

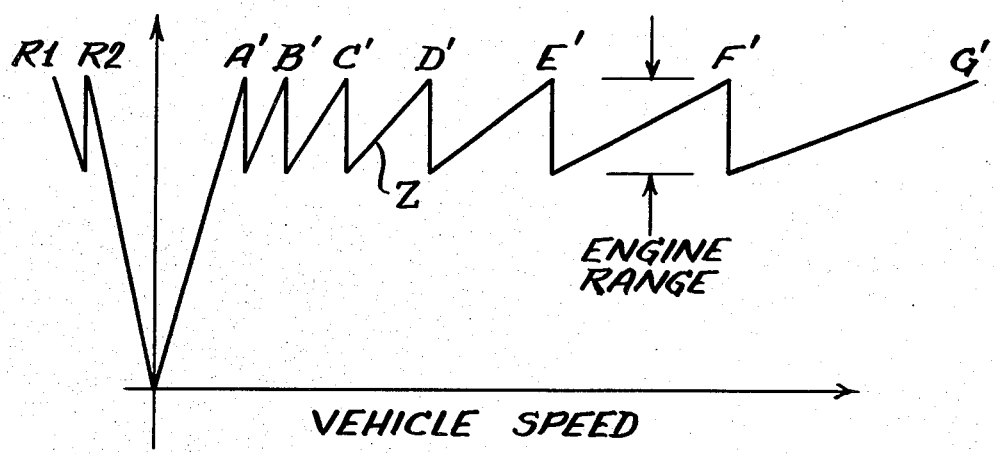

INFINITELY VARIABLE TRANSMISSION

TECHNICAL FIELD

This invention relates to an infinitely variable transmission mechanism for use in a motor driven apparatus, and while not limited thereto, is particularly suited for use in motor vehicles. More particularly this invention relates to a mechanism which inputs power through two separate paths where output speed may be infinitely varied in a range defined by the power in each path and a transmission system utlizing the same.

BACKGROUND ART

Conventional step transmissions are well known in the art using fixed ratio gearing which requires engine speed to increase in order to increase speed at the output. Except for changing gears, the transmission itself does not adjust to vary transmitted power. When used in motor vehicles, frequently any change in vehicle speed must result from a change in engine speed. Thus, the engine is frequently accelerated and decelerated, imposing considerable stress on the engine and drive train and increasing maintenance costs. Further, this changing of gears during operation of the vehicle requires that the drive be momentarily disconnected since power is transmitted exclusively through the single engaged gear pair.

Conventional transmissions further have an energy loss appearing as a heat pulse in the clutches when changing gears. For example, during vehicle acceleration, engine speed and thus vehicle speed are increased until a certain maximum engine speed is reached. At that point, a different gear pair is engaged which requires a lower engine speed to operate at that particular vehicle speed. Since the appropriate lower engine speed will seldom exist when the new gear pair is engaged, an energy loss resulting from a heat pulse occurs as the clutch slips until the appropriate engine speed exists. This heat pulse/energy loss is largest when the gear pairs are shifted with high torque on both gear shafts and thus must be considered in designing the gear pairs and clutch. The heat pulse can be limited by minimizing speed variations between gear pairs. This reduces the heat pulse but requires more gears and thus more shifting over a given range of vehicle speed. Consequently, heavy duty clutches which can handle large heat pulses are often necessary to hold down the number of gear pairs which must be used.

Infinitely variable transmissions already exist in several forms including belt and pulley, wheel on disc, interleaved discs, annular, double annular and nutating tubular types. These transmissions generally include a static torque reaction member. In addition, each receives power through a single path. Thus, although all may infinitely vary transmitted torque or speed within a range, the range itself may not be changed without disconnecting the drive. This results in the same drawbacks as are outlined above for conventional transmissions (i.e. heat pulse/energy loss occurring when gears are changed during high torque conditions, requiring higher cost clutches and gearing). Several varieties of these transmissions may avoid this problem by operating only within a single range so as to maintain drive at all times during operation. To transmit a desired wide range of power, these transmissions must be relatively bulky because component sizes must be increased. Similarly, such single range transmissions require that large normal forces be used to obtain sufficient traction forces, resulting in large component sizes due to design controlling stiffness and stress limitations.

The present invention is directed to overcoming one or more of the problems as set forth above.

DISCLOSURE OF THE INVENTION

In one aspect of the present invention, the transmission mechanism has first and second power input paths having different speeds which provide power to the transmission so that the speed of the transmitted power may be infinitely varied in a range defined by the input of the first and second paths. According to the invention, there are provided two shafts or paths which input power to the transmission which drives a shaft which outputs power. An adjustable ratio varying element relates motion of the three, permitting the speed of the transmitted power to be infinitely varied in a range defined by the speeds of the two paths. When the speed of the transmitted power is at either end of the range, the speed in the path defining the other end of the range may be changed without energy loss or with much reduced loss.

In another aspect, the invention has stepped ranges of variability and since normal forces may be internally balanced, it may be much smaller in size than those transmissions having a single range. Further, the invention permits gear pairs on one path to be changed during zero torque conditions (i.e. when the output power is controlled entirely by the input power in the other path), so that the heat pulse/energy loss in the clutches is virtually eliminated. This permits use of small clutches and fewer gear pairs.

In contrast to prior transmissions, this invention is relatively compact and may at a constant engine speed infinitely vary the output speed within the desired operation range. In effect, this permits a motor driven apparatus having this transmission to be operated with the engine set at a single speed which can be selected for reasons of minimum fuel consumption, noise, response to load change or other factors.

BRIEF DESCRIPTION OF THE DRAWINGS

FIG. 1 is a sectional view of the preferred embodiment of a transmission made according to the invention;

FIG. 2 is a diagrammatic perspective view having only one traction point for clarity showing the interaction of the moving parts of this transmission;

FIG. 3 is a diagrammatic perspective view showing a mechanism for varying the drive ratio of the transmission;

FIG. 6 is a graph indicating the relationship between engine speed and vehicle speed during operation of a vehicle with a conventional transmission; and FIG. 7 is a graph similar to FIG. 6 for a vehicle with the transmission provided with additional gearing according to the invention.

BEST MODE FOR CARRYING OUT THE INVENTION

Figure 4:
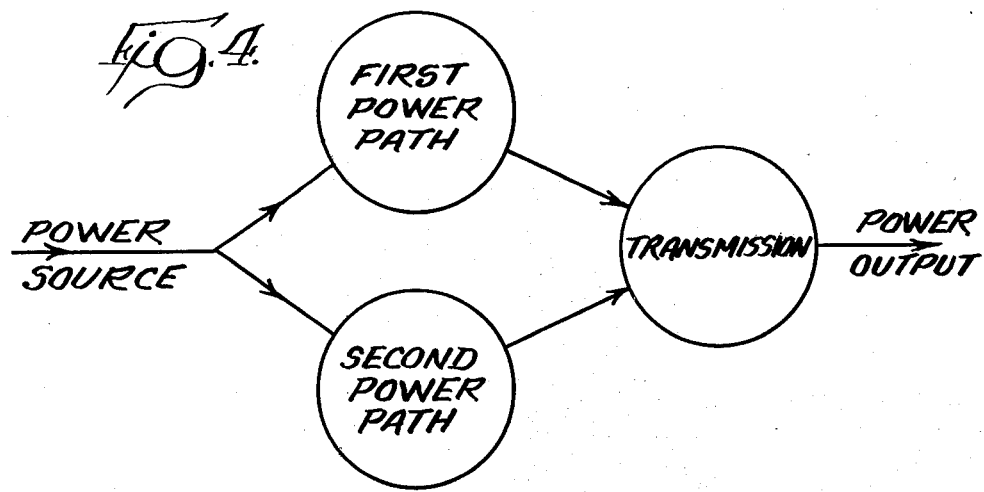
FIG. 4 is a schematic of a drive train employing the transmission.

The inner components of an embodiment of a transmission made according to the invention are shown in detail in FIG. 1. This unit consists essentially of four dynamic components which accomplish the purposes detailed above. These consist of two input shafts, an output shaft and a ratio varying component which ties motion of the three shafts together.

The working relation of these components is shown in simplified detail in FIG. 2. The ratio varying component is a bevel wheel 12 which rests on the spherical segment 13 of an output shaft 14 at a single traction point. A power gear 11 and input gear 15 drive a first input shaft 16 which drives a housing, shown schematically at 18, through rotation around an axis 20, causing the axis 22 of the bevel wheel 12 to nutate. A second power gear 23 and input gear 24 drive a second input shaft 25. The shaft 25 drives a bevel gear 26 which meshes with bevel teeth 27 on the perimeter of the bevel wheel 12 to cause the wheel 12 to rotate around its axis 22. The traction point may be adjusted by shifting the bevel wheel axis to tie together motion of the output shaft 14 with the motion of one of the points in an arc on the surface of the bevel wheel 12.

As described in greater detail hereinafter, the bevel wheel 12 contacts the spherical segment 13 at an adjustable point lying in a plane defined by the two axes 20, 22, the motion of both components 12,13 in that plane being identically directed, with the rotation speed of the output shaft 14 being equal to that of the first input shaft 16 when the point is on the bevel wheel axis 22, and equal to that of the second input shaft 25 when the contact point is at the bevel teeth 27, and in a range between the two input shaft's rotation when the point is between those two extremes.

It should be understood that the transmission of this invention could also be operated with the power output shaft 14 used as one of the inputs. The arrangement described however is preferred inasmuch as only this arrangement will function so as to provide the desired conditions for changing power at zero torque in either of the input shafts in a preferred system utilizing the transmission. It should also be understood that the term "nutate" as used in the specification and the claims, though used in its commonly accepted meaning to describe rotation of the tilted axis 22 as shown in the drawings, is also meant to include simple rotation of a non-tilted axis. This invention can operate with the two axes 20,22 perpendicular to each other. Finally, although this invention would operate with the spherical segment 13 actually shaped like an ellipsoid or merely convex, it is preferred that the segment 13 be spherical to balance the internal forces. A bending moment from the forces at the traction points would exist if the segment 13 were not spherical. In addition, the bevel wheels 12a,12b may more nearly conform to the segment 13 when it is spherical and thus the transmission may be more compactly constructed.

The components of the embodiment in FIG. 1 are essentially the same as those described in FIG. 2 except that there are two ratio varying components which act identically and permit the internal forces to be balanced. Thus, engaging the spherical segment 13 of the output shaft 14 are two concave bevel wheels 12a,12b which enable the ratio of the transmission to be infinitely varied. Each has a concave interior traction surface 28a,28b having a radius slightly larger than the radius of the spherical segment 13 of the output shaft 14. Although these surfaces 28a,28b could be flat or even convex, use of the concave shape is preferred inasmuch as it enables the transmission to be compactly constructed. Each bevel wheel 12a,12b has bevel teeth 27a,27b around its outer perimeter.

The housing 18 consists of two segments 18a,18b which are essentially two half shells surrounding the wheels 12a,12b to carry them in rotation around the central axis 20. Each housing segment 18a,18b has journal bearings 38a,38b which mount the wheels 12a,12b for rotation around the nutating axes 22a,22b. These journal bearings 38a,38b locate both bevel wheels 12a,12b so that all three axes 20,22a,22b lie in a single plane. Each housing segment 18a,18b also contains a thrust bearing 40a,40b for the bevel wheels 12a,12b.

The first input shaft 16 which drives the housing 18 in rotation around the central axis 20 is shown in this embodiment to consist of two triangular projections from the first input gear 15. This connection is shown in detail in FIG. 3 which is discussed below. When multiple gear pairs are used, the input shaft 16 may be an actual shaft with the triangular projections extending therefrom and the shaft being selectively engaged by one gear pair.

The second input means consists of two input shafts 25a,25b which are driven by identical gears 24a,24b so that motion of each is the same. When multiple gear pairs are used for purposes to be seen, the second input shafts 25a,25b may be driven by gears 24a,24b shown, with the gears 24a,24b being driven by idler gears rotating on a shaft along with the multiple gear pairs. In this manner, both of the second input shafts 25a,25b may be identically driven and only one set of multiple gears and one clutch used.

Each of the second input shafts 25a,25b drives a bevel gear 26a,26b which meshes with the bevel teeth 27a,27b on the corresponding bevel wheel 12a,12b. One bevel gear 26a rotates within a collar 48a in one housing segment 18a. The other bevel gear 26b rotates within a collar 48b in the other housing segment 18b. In this manner, the second input means helps to define rotation of the bevel wheels 12a,12b around their axes 22a,22b.

The entire mechanism is held by supports 50 which fix the central axis 20.

As indicated, all three axes 20,22a,22b lie in a single plane. The bevel wheels 12a,12b are held in place so that they each engage the spherical segment 13 only at a single point within that plane. At any point in the arc within that plane, motion of both the spherical segment 13 and the bevel wheels 12a,12b is perpendicular to the plane. Thus, such a locus of traction points is used to relate the motion of the bevel wheels 12a,12b and the spherical segment 13.

Because motion of each bevel wheel 12a,12b is the mirror image of the other, the traction point on each is similarly located. Thus, as shown in FIG. 1, the traction point 52a on the top bevel wheel 12a is located so that a line drawn between it and the traction point 52b on the other bevel wheel 12b passes through the center of the spherical segment 13. This relation between traction points ensures that the bevel wheels 12a,12b each transmit the same rate of rotation to the spherical segment 13 and also results in the balancing of internal forces as previously mentioned.

The apparatus which locates the traction points is shown in simplified detail in FIG. 3. The bevel wheels 12a,12b are not shown and the housing segments 18a,18b are represented as flat surfaces merely to omit detail not necessary for an understanding of this feature. The spherical segment 13 is enclosed on opposite sides by the housing segments 18a,18b. The input gear 15 is drivably connected to the housing segments 18a,18b through the input shaft projections 16 and identical eccentric shafts 54. The eccentric shafts 54 are rotatably mounted to the input shaft projections 16 and housing segments 18a,18b by bearings 56,58,60 on each. The eccentricity of the eccentric shafts 54 should be sufficient to shift the bevel wheels 12a,12b and their axes 22a,22b enough so that the traction point 52 can be moved between the bevel wheel axes 22a,22b and the point where the bevel wheels 12a,12b engage the bevel gears 26a,26b.

Lever arms 62 for rotating the eccentric shafts 54 may be pivoted by any conventional method while the entire apparatus rotates around the central axis. For example, a cylindrical component (not shown) having a track rotatably receiving the lever arms 62 and being axially movable to pivot the lever arms 62 could be used.

The ends of the housing segments 18a,18b remote from the input gear 15 are provided with oppositely directed hydraulic cylinders 64 (only one of which is shown in FIG. 1) which may receive hydraulic fluid under pressure through any suitable rotary coupling. A collar 65 around the cylinders 64 ensures that equal force is applied to both housing segments 18a,18b. Application of fluid to the cylinders 64 rotates the housing segments 18a,18b about the axes defined by the respective eccentric shafts 54 towards each other. Through suitable control of the pressure applied to the cylinders 64, the frictional forces applied at the traction points 52a,52b via the thrust bearings 40a,40b may be adjusted as desired so that heavy normal loads at the contact points are only applied under highest torque conditions.

Translation of the eccentric shafts 54 by pivoting the lever arms 62 causes the housing segments 18a,18b to move equally axially in opposite directions relative to each other as well as changes slightly the distance between the segments 18a,18b at that end. Specifically, the offset of the eccentric shaft 54 for each housing segment 18a,18b is equal and opposite relative to the pivot point of the eccentric shaft 54 on the input shaft projection 16. Thus, when the eccentric shafts 54 pivot, the housing segments 18a,18b are moved axially in equal and opposite directions. The housing segments 18a,18b of course carry the bevel wheels 12a,12b with them in this movement and since there is no transverse movement, the bevel wheels 12a,12b are shifted so that the traction points 52a,52b remain in the appropriate plane. For example, if the lever arms 62 were pivoted in the direction indicated by the arrow, the top housing segment 18a would move forward and the bottom housing segment 18b would move toward the rear. This would cause the traction point 52a on the top bevel wheel 12a to move toward the rear while the traction point 52b on the bottom bevel wheel 12b would move an equal amount toward the front.

Referring again to FIGS. 1 and 2 for greater detail about the working of the transmission, and particularly at present to FIG. 2, the bevel wheel 12 engages the spherical segment 13 of the output shaft 14 at a single traction point 52 in the plane defined by the axes 20,22 of these two components so that the power which is output is controlled by the motion of the bevel wheel 12 at the traction point 52. Motion of the bevel wheel 12 is dependent upon the power delivered by both input shafts 16,25. Thus, motion of any traction point 52 is a function of these two shafts.

The traction point 52 actually consists of the constantly changing engagement of two loci of points at one point. One locus of points 66 is the circle defined by the intersection of the concave surface 28 of the bevel wheel 12 and the plane passing through the traction point 52 and lying perpendicular to the bevel wheel axis 22. The other locus of points 68 is the circle defined by the intersection of the surface of the spherical segment 13 and the plane passing through the traction point 52 and lying perpendicular to the central axis 20. There are of course different loci for different traction points 52.

With an understanding of these details, it can be seen that if the traction point 52 is on the bevel wheel axis 22, the speeds of rotation of the output shaft 14 and the input shaft 16 driving the housing 18 are identical for any rotation of the other input shaft 25. Similarly, if the traction point 52 is on the outer periphery of the bevel wheel 12 at the point where it meshes with the bevel gear 26, the speeds of rotation of the output shaft 14 and the input shaft 25 driving the bevel gear 26 are identical for any rotation of the other input shaft 16. The rotation of the output shaft 14 may be infinitely varied in a range defined by the rotation of the input shafts 16,25 by moving the traction point 52 between these two extremes, where rotation of the three shafts 14,16,25 is related according to the following equation:

$$\omega_O = K\omega_B + (1-K)\omega_H$$

where:
$\omega_O$ = rotation of the output shaft 14,
$\omega_B$ = rotation of the bevel gears 26a,26b,
$\omega_H$ = rotation of the housing 18 or shaft 16, and
$K = (R_T r_B)/(R_W r_T)$ where, as shown in FIG. 1:
  $R_W$ = radius of the bevel wheels 12a,12b;
  $r_B$ = radial distance from the output shaft axis 20 to the points where the bevel wheels 12a,12b mesh with the bevel gears 26a,26b;
  $R_T$ = radius of the bevel wheels 12a,12b at the traction points 52a,52b; and
  $r_T$ = radial distance from the output shaft axis 20 to the traction points 52a,52b.

In the preferred embodiment of this invention, the traction point is varied between the bevel wheel axis 22 and the point where the bevel wheel 12 and bevel gear 26 mesh so that $R_T \geq 0$. The transmission also will function with traction points having negative $R_T$ values. This change increases the range of output speed but does not provide the zero torque condition detailed below for changing drive gear pairs.

The mechanism described provides a system which operates as shown in FIG. 4. The transmission receives power through two separate paths and can be adjusted to infinitely vary the speed with which it transmits power in a range bounded by the speeds of the separate power inputs. By adjusting the transmission so that power is transmitted from only one path, the speed in the other path may be changed during zero torque conditions, thereby changing the range of speeds which the transmission may put out. By repeatedly changing the speed in the path establishing the lower limit on the range so that it establishes a new upper limit, the effective range of the transmission can be greatly increased.

Figure 5:
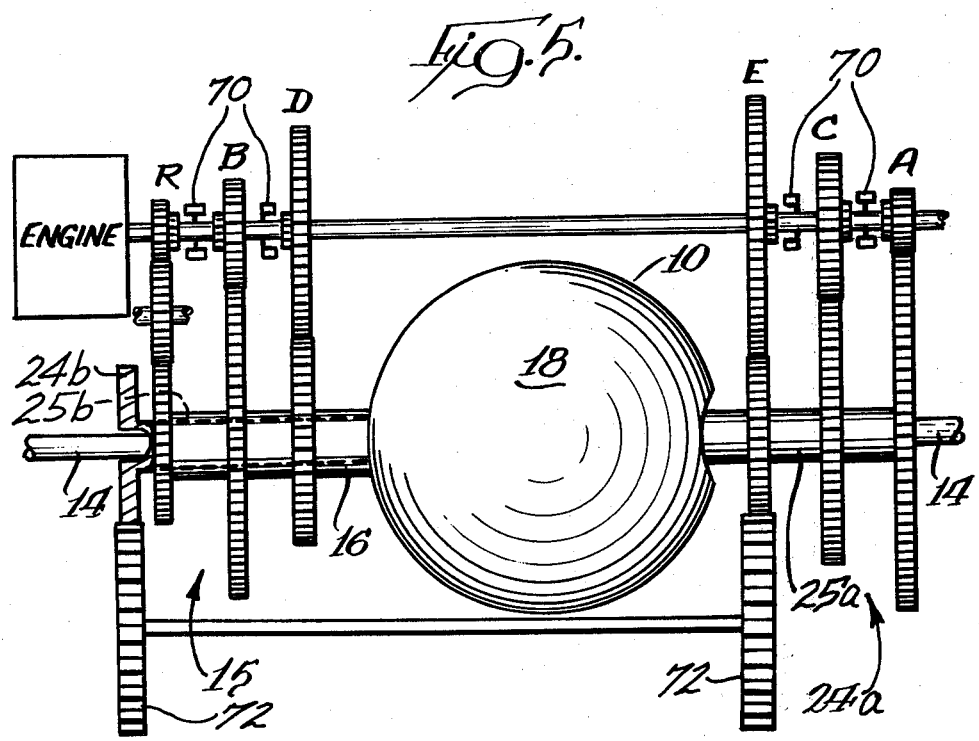
FIG. 5 is a partial schematic illustrating use of the transmission with additional gearing.

FIG. 5 shows a simplified schematic of a typical embodiment which permits the stepwise increase in the range of transmitted power. To simplify discussion, the interior working components of the transmission are not shown. Shift collars 70 are indicated for selectively engaging gear R, B or D and gear A, C or E. A set of gears 72 are provided fixed relative to one another to transmit torque from gear 24a to gear 24b, causing both second input shafts 25a,25b to be driven at the same rate.

When the engine is started, a specific neutral traction point is established with gears R and A engaged so that the transmission output speed will be zero. Such a traction point exists because of the opposite rotation of the input shafts 16,25 and may be located for any transmission from the above equation. At the zero output speed the engine may be warmed up and set at any desired speed M (FIG. 7). Rotation of the output shaft 14 may then be infinitely varied within a range without changing engine speed.

For reverse rotation of the output shaft 14, the traction point is moved toward the axis 22 of the bevel wheel 12. Maximum reverse speed is obtained with the traction point on that axis 22.

For forward rotation of the output shaft 14, the traction point 52 is moved from the neutral position to the periphery of the bevel wheel 12. In this position, output speed is controlled entirely by gear A. Gear R can thus be disengaged and gear B engaged during a zero torque condition. The output speed can then be accelerated by moving the traction point 52 toward the bevel wheel axis 22, at which point gear A can be disengaged and gear C engaged during a zero torque condition. Again, the traction point 52 can be moved away from the axis 22 to the periphery of the bevel wheel 12 at which point gear B can be disengaged and gear D engaged during zero torque conditions. The traction point 52 can again be shifted to the axis 22 at which point gear C can be disengaged and gear E engaged during zero torque conditions. With this gearing arrangement, maximum speed would be obtained with gear E engaged and the traction point 52 at the periphery of the bevel wheel 12.

Line X in FIG. 7 indicates the manner in which a vehicle having this transmission and gearing may be operated. A single engine speed (M) can be set and vehicle speed may be varied along line X by shifting the traction point and changing the gear pairs as outlined above.

In contrast, jagged line Z in FIG. 6 shows the manner of operation for a vehicle having a conventional step transmission. Engine speed must continually be changed to change vehicle speed. Further, since gear pairs are changed during high torque conditions, narrowly spaced ratios of gear pairs are required to reduce clutch duty so that to obtain a given range of vehicle speed, more gear pairs are required.

This external bevel precessing traction transmission is the preferred mode of this invention though the invention could be accomplished by either contrate or internal bevel mechanisms. Such types differ with regard to the bevel angle ($\alpha$) of the bevel wheels, the bevel angle being the semi-included angle of the bevel wheel (i.e. the angle between the radial passing through the bevel wheel teeth 27 and the axis opposite the bevel gear). In the preferred mode shown in FIG. 1, $\alpha < 90°$.

In contrast, for a contrate bevel mode, the bevel wheel is hemispherical and thus $\alpha = 90°$. Because of the larger size of the bevel wheel, the spherical segment with this mode must be on the end of the output shaft and only one such wheel can be used. Thus internal forces cannot be balanced. With an internal bevel mode, the bevel wheel is actually shaped more like a ring with its traction surface being essentially a part of the bottom of an imaginary sphere. This ring encircles the central axis of the output shaft. Thus, $\alpha < 90°$ for the internal bevel mode. With internal bevel mechanisms, as with external bevel mechanisms, traction and normal loads on the spherical segment 13 are fully balanced internally and traction points are located near the maximum radius of the transmission where they are most effective for transmitting torque.

INDUSTRIAL APPLICABILITY

This invention is particularly suited for mechanisms which require a range of output power which cannot be obtained through use of only a single gear pair. This is especially advantageous when their operation requires frequent increases and decreases in transmitted power. An obvious mechanism which would benefit from use of this invention is a motor vehicle, particularly heavy construction vehicles. Because of the comparatively compact size, it is particularly beneficial for use in mechanisms where size is a constraint, again a typical example being a motor vehicle.

I claim:

1. A device for transmitting power from a prime mover comprising:
   first (16), second (25) and third (14) rotary power shafts;
   a first fixed ratio gear pair (15,B) connecting said first rotary power shaft (16) to the prime mover;
   a second fixed ratio gear pair (24,A) connecting said second rotary power shaft (25) to the prime mover;
   means (12) for transmitting power to said third rotary power shaft (14) from said first (16) and second (25) rotary power shafts including means (18,54) for selectively transmitting power at either the speed of said first rotary power shaft (16) or the speed of said second rotary power shaft (25) and for infinitely varying the speed of said third rotary power shaft (14) to vary within a range bounded by the speeds of said first (16) and second (25) rotary power shafts; and
   means for changing one of said engaged gear pairs (15,24) with a different ratio gear pair during zero torque conditions while said other engaged gear pair (24, 15) transmits power to said third power shaft (14).

2. An infinitely varying power transmission comprising:
   means (16) defining a first input power path having a first input speed;
   means (25) defining a second input power path having a second input speed;
   means (14) defining an output power path;
   means (12) defining a transmission element receiving power from said first (16) and/or second (25) power paths and transmitting power so received to said output power path (14); and
   means (18,54) for infinitely adjusting said transmission element defining means (12) to transmit power at an output speed within a range bounded by the input speeds of said input power paths (16,25) whereby said range may be changed by changing the input speed of one input power path when the output speed of the transmitted power is independent of said one input speed.

3. The infinitely varying power transmission of claim 2, wherein said three power path defining means comprise one output and two input power members (14,16,25) which rotate around a common axis (20) with said transmission element defining means (12) relating the rotation of each member to the others.

4. The infinitely varying power transmission of claim 3, wherein said transmission element defining means (12) comprises a transmitting element (12) which rotates around a nutating axis (22) and further comprising:
    means (18,38,40) connecting said first input power member (16) for rotation with said nutating axis (22);
    means (26,27) connecting said second input power member (25) for rotation in relation to the rotation of said transmitting element (12) around its nutating axis (22); and
    means for equating the motion of a point on said output power member (14) to the motion of a point (52) on a surface (28) of said transmitting element (12).

5. An infinitely variable power transmission comprising:
    means defining a first power path (14);
    means defining a second power path (16);
    means defining a third power path (25);
    means defining a transmitting element (12) which is rotatable about a nutating axis (22);
    means (18,38,40) relating the speed of nutation of said axis (22) and the speed of said second power path defining means (16);
    means (26,27) relating the rate of rotation of said transmitting element (12) about its axis (22) and the speed of said third power path defining means (25); and
    adjustable means (52) for delivering power between said transmitting element (12) and said first power path defining means (14), whereby the power delivered between said transmitting element (12) and said first power path defining means (14) may be related to power in only one of the other two power path defining means (16,25).

6. The infinitely variable power transmission of claim 5, wherein:
    each of said power path defining means comprise a rotating member; and
    said adjustable means for delivering power between said transmitting element (12) and said first rotating member (14) comprises a changeable frictional contact between a point on the surface of said element (12) and a point on the surface of said first member (14).

7. The infinitely variable power transmission of claim 6, wherein all three rotating members (14,16,25) rotate around a common axis (20).

8. In a drive train having a power source, an infinitely variable power transmission comprising:
    a transmitting element (12) which rotates about a nutating axis (22) and drives an output shaft (14);
    adjustable first coupling means between said power source and said transmitting element (12) causing said axis (22) to nutate;
    adjustable second coupling means between said power source and said transmitting element (12) for driving said element (12) in rotation about said axis (22); and
    wherein said output shaft (14) is driven at a rate within a range, said rate defined by the motion of a point (52) where said output shaft (14) and said transmitting element (12) contact, either of said coupling means being adjustable to change said range when a point (52) is selected having a motion controlled by the power delivered solely through the other of said coupling means.

9. The infinitely variable power transmission of claim 8, wherein:
    said adjustable first coupling means comprises a shaft (16) which carries said nutating axis (22) and is driven by the power source through a set of gear pairs, any pair of which may be selectively engaged; and
    said adjustable second coupling means comprises a shaft (25) and bevel means (26,27) connecting said shaft (25) to the perimeter of said transmitting element (12), said shaft (25) being driven by the power source through a set of gear pairs, any pair of which may be selectively engaged.

10. The infinitely variable power transmission of claim 9, wherein either engaged gear pair may be disengaged and replaced by a different ratio gear pair during zero torque conditions.

11. In a drive train having a power source, an infinitely variable power transmission comprising:
    a first shaft (14) rotatable around a first axis (20) and having a convex segment (13) symmetrical around said first axis (20);
    a housing (18) around the convex segment (18) of said first shaft (14);
    means (16) coupling the power source and said housing (18) for driving said housing (18) in rotation around said first axis (20);
    a first bevel wheel (12a) connected to said housing (18) so as to be rotatable around a second axis (22a) carried with said housing (18), said second axis (22a) defining a rotating plane by its intersection with said first axis (20), and said first wheel (12a) contacting the convex segment (13) of said first shaft (14) at a traction point (52a) in the plane defined by said first and second axes (20,22a);
    a first bevel shaft (25a,26a) rotatable around said first axis (20) and meshed with said first wheel (12a,27a); and
    means (54,62) for moving the traction point (52a) within said plane.

12. The infinitely variable power transmission of claim 11, further comprising:
    a second bevel wheel (12b) on the convex segment (13) of said first shaft (14), rotatable around a third axis (22b) within said plane which is carried by said housing (18) and frictionally contacting said first shaft (13,14) at a point (52b) opposite the traction point (52a) of the first bevel wheel (22a);
    a second bevel shaft (25b,26b) rotating with said first bevel shaft (25a,26a) and meshing with said second wheel (12b,27b); and
    wherein said means (54,62) for moving the traction points (52a,52b) maintains them in proper relation.

13. The infinitely variable power transmission of claim 12, wherein said means for moving the traction points comprises:
    two half shells (18a,18b) which form said housing;
    adjustable force clamping means (64) holding one end of said shells (18a,18b) together;
    two trunnions (58,60) in each shell (18a,18b) at the end opposite said clamping means (64);
    two eccentric shafts (54) mounted on said second shaft (16) and extending through said nonaligned trunnions (58,60); and
    means (62) for pivoting said eccentric shafts (54) together.

14. The infinitely variable power transmission of claim 13, wherein:
said convex segment (13) is spherical; and
said wheels (12a,12b) have spherical concave traction surfaces having a radius larger than the spherical segment (13) of said first shaft (14).

15. An infinitely variable power transmission having three shafts differentially rotatable around the same axis, any two of which may be driven so as to drive the third, comprising:
a first shaft (14) rotatable around a first axis (20) and having a convex segment (13) symmetrical around said first axis (20);
a housing (18) around the convex segment (13) of said first shaft (14);
a second shaft (16) coupled to said housing (18) for carrying it in rotation around said first axis (20);
at least one wheel (12a) connected to said housing (18a) and rotatable around a second axis (22a) which intersects said first axis (20) and is carried with said housing (18a), said wheel (12a) contacting the convex segment (13) of said first shaft (14) at a traction point (52a) in the plane defined by said first and second axes (20,22a);
a third shaft (25a) rotatable around said first axis (20);
bevel means (26a,27a) connecting said wheel (12a) and third shaft (25a); and
means (54) for adjusting said wheel (12a) to move the traction point (52a) within said plane.

16. The infinitely variable power transmission of claim 15, further comprising:
a second wheel (12b) on said convex segment (13), rotatable around a third axis (22b) lying within said plane and carried by said housing (18b) to contact said convex segment (13) at a traction point (52b) opposite the traction point (52a) of said first wheel (12a);
a fourth shaft (25b) rotating with said third shaft (25a) but on the opposite side of said convex segment (13);
second bevel means (26b,27b) connecting said second wheel (12b) and fourth shaft (25b); and
means (54,62) for adjusting both wheels (12a,12b) together to maintain the proper relation between said traction points (52a,52b).

17. The infinitely variable power transmission of claim 16, further comprising means (15,24a,24b,FIG. 5) driving said second (16), third (25a) and fourth (25b) shafts; wherein
said third (25a) and fourth (25b) shafts are driven at an identical rate; and
said means (16,25a,25b,FIG. 5) may be adjusted to change the rate which either said second shaft (16) or said third (25a) and fourth (25b) shafts are driven.

18. An infinitely variable power transmission comprising:
a power source;
a driven shaft (14) rotatable about a first axis (20) and having a convex segment (13) symmetrical around said first axis (20);
a housing (18) surrounding said convex segment (13);
first drive means (16) carrying said housing (18) in rotation about said first axis (20);
second drive means comprising a first wheel (12a) rotatable around a second axis (22a) carried with said housing (18a) and which defines a plane by its intersection with said first axis (20), said wheel (12a) contacting said convex segment (13) at a traction point (52a) in said plane, a first drive shaft (25a) rotatable about said first axis (20), and bevel means (26a,27a) connecting said first wheel (12a) and said first drive shaft (25a); and
means (54) for adjusting said wheel (12a) to move said traction point (52a).

* * * * *